April 26, 1966 W. LIPP 3,247,938
DEVICE FOR THE AUTOMATIC DISPLACEMENT OF THE MOVABLE
COUPLING-PIECES FROM THE CLUTCHES OF A
COUPLING, WRENCHES OR THE LIKE
Filed Aug. 5, 1963

INVENTOR:
WILLI LIPP,

BY

*Ernest P. Marmorek,*
HIS ATTORNEY.

United States Patent Office 3,247,938
Patented Apr. 26, 1966

3,247,938
DEVICE FOR THE AUTOMATIC DISPLACEMENT OF THE MOVABLE COUPLING-PIECES FROM THE CLUTCHES OF A COUPLING, WRENCHES OR THE LIKE
Willi Lipp, Im Wullen 48b, Witten-Annen, Germany
Filed Aug. 5, 1963, Ser. No. 299,962
2 Claims. (Cl. 192—105)

The invention relates to actuating mechanisms, and relates more particularly to disengageable clutches for releasably actuating one part of a clutch with another. Still more particularly, the invention relates to releasable clutches of the type in which one part forms a tightening device on a wrench or similar clamp, or the like, and the other releasably engages the one part to transmit releasably torque thereto. Still further particularly, the invention relates to a device for carrying and simultaneously rotating and axially displacing such a clutch member thereby releasably to engage the other member for transmitting torque thereto, and subsequently to be disengaged therefrom.

It is among the principal objects of the invention to provide such a device which will simultaneously rotate and thrust forwardly, or retract, one member of a releasable clutch.

It is another object of the invention to provide such a device in which there is a driving shaft and a driven shaft, and the driving shaft is in rotational driving connection with the driven shaft and is also operatively in connection with the driven shaft to displace the driven shaft axially when the driven shaft is rotated.

Further objects and advantages of the invention will be set forth in part in the following specification and in part will be obvious therefrom without being specifically referred to, the same being realized and attained as pointed out in the claims hereof.

Figure 2:
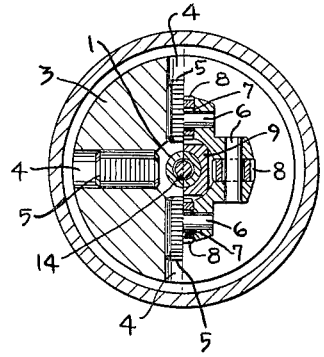
Figure 1:
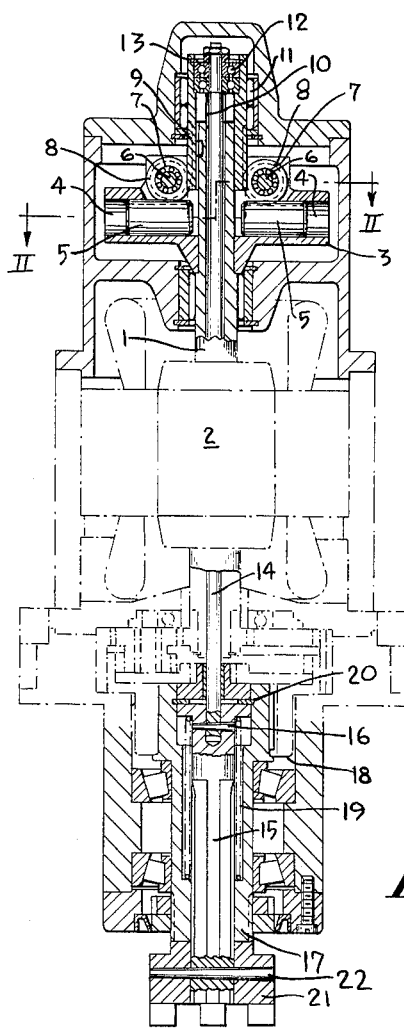

For a fuller understanding of the nature and objects of the invention, reference should be had to the following detailed description, taken in connection with the accompanying drawings, in which:

FIG. 1 is a vertical, partly schematic sectional view of a device in accordance with the invention; and FIG. 2 is a sectional view, taken on the line II—II of FIG. 1.

In carrying the invention into effect, there is provided a driving shaft 1 that is driven by an electric motor 2, and extends on both sides of the motor 2. The driving shaft 1 is hollow and a connecting rod 14 is disposed inside the hollow driving shaft 1 and is axially shiftable or displaceable relative to the driving shaft 1. While the rod 14 is rotatable, it can rotate independently of the speed of rotation of the driving shaft.

A driven shaft 15 is provided at one end of the device and carries, by means of a key 22, a clutch member 21. The clutch member 21 forms part of a releasable clutch or coupling-device (not shown) of well-known suitable construction, and the clutch member 21 is operative to engage the other member of the clutch releasably to impart torque thereto. Thereafter, it may be disengaged from the clutch.

The driven shaft 15 is rotatable, and is also shiftable axially about its axis of rotation (which coincides with the central vertical axis of FIG. 1). Shifting means are provided for shifting the driven shaft 15 in response to the rotation of the driving shaft 1. These shifting means include actuating means which are connected to the driving shaft 1 and to the driven shaft 15 and comprise the aforesaid rod 14; the actuating means furthermore comprise radial housings 3 which are mounted on and secured to the driving shaft 1. Radial bores 4 are defined in the housings 3.

In each bore 4 there is radially movable in opposite directions a weight 5 that carries an upper thread. In each housing 3 there is journalled about a pivot 6 and a bearing 7 a rotatable gear 8 that engages the thread of the respective weight 5.

The driving shaft 1 and the driven shaft 15, as shown in FIG. 1, are rotatable about the same coinciding axis of rotation.

A bushing 9 is shiftable alongside the coinciding axis of rotation, in opposite directions. The bushing 9 is in driven connection with the gears 8, so that rotation of the gears 8 will be converted into axial shifting movement of the bushing 9, and vice versa.

The bushing 9 is connected to the upper end (FIG. 1) of the rod 14, by means of bearings 12 and a safety ring 13, in such a manner that the rod 14 will be shifted axially together with the bushing 9, but may rotate relative to the bushing.

Near the lower end (FIG. 1), the connecting rod 14 is secured, by means of a tapered pin 16 to the driven shaft 15. This connection is such that the connecting rod 14 and the driven shaft 15 are tied together so that they will be axially shifted, as well as rotated, together.

Thus, when the driving shaft 1 is rotated, the weights 5 will be thrust radially outwardly, which will cause the turning of the gears 8 and the corresponding lowering (FIG. 1) of the bushing 9 and therewith of the connecting rod 14. With the connecting rod 14, there will also be lowered, relative to the remainder of the device, the driven shaft 15. By this lowering, the clutch member 21 will be thrust forwardly (downwardly, FIG. 1) so that it may engage the remainder of the releasable clutch (not shown).

A retraction or compressing spring 19 is provided between a shoulder of the driven shaft 15 and a step in a sleeve 17 that surrounds the upper portion of the driven shaft 15. When the driven shaft 15 is thrust forwardly, as just described, the spring 19 will be compressed; and after the forward thrust has ceased, the spring 19 will retract the driven shaft 15 and the connecting rod 14 into the initial inactive position. By this retraction, the clutch member 21 will be disengaged from the remainder of the clutch. The forward thrust thus takes place against the action of the spring 19.

The motor 2 may be connected to a source of electric energy, and have a switch (not shown) that may be turned on and off for starting and, respectively, stopping the rotation of the motor 2.

A ring 20 is provided which serves to limit the return stroke of the driven shaft 15 under the impulse of the retraction spring 19.

The said sleeve 17 and the driven shaft 15 are provided with splines, so that they are tied for rotation, but the driven shaft 15 is axially displaceable relative to the sleeve 17. Transmission means are provided for rotating the driven shaft 15 from the driving shaft 1. These transmission means comprise a planetary gearing that engages that part of the driving shaft 1 that is disposed on the lower side (FIG. 1) of the motor 2; and includes the driven gear 18 of the planetary gearing. The gear 18 is keyed or otherwise secured to the sleeve 17, so that the sleeve 17, and therewith the driven shaft 15, will rotate with the gear 18.

The operation is as follows:

When the motor 2 is switched on, the hollow driving shaft 1 will be rotated. The aforesaid transmission is a step-down transmission, so that during the transmission from the driving shaft 1 to the gear 18, the rotational speed is reduced; and the sleeve 17 as well as the driven shaft 15 will be rotated at the reduced speed of the gear 18. This reduced speed is so chosen to be in accord with the desired driving speed of the clamping device (not shown) to which torque is to be applied, for tightening or loosening, respectively, by the clutch of which the clutch member 21 forms a part.

Thus, the driving shaft 1 rotates at a higher speed than the driven shaft 15. The centrifugal weights 5 are energized by the higher speed of the driving shaft 1, and will cause a downward axial shifting of the bushing 9, connecting rod 14, and the driven shaft 15. This axial movement is imparted to the clutch member 21 along with the slow rotational speed, by the driven shaft 15, enabling the clutch member 21 to engage the remainder of the clutch.

The shifting means and transmission means are independent of the direction of rotation of the driving shaft 1 and of the motor 2. The motor 2 may include a terminal switch (not shown) that may be operated when the torque transmission has been completed.

Upon de-energizing of the motor 2, the retraction spring 19 will return the driven shaft 15 to its initial position, thereby withdrawing the clutch member 21 from its engagement in the clutch.

It will be understood that the terms "lower" and alike, used herein, have been employed only for the sake of clarity, and not in any limiting sense, save as restricted in the claims hereof.

I wish it to be understood that I do not desire to be limited to the exact details of construction shown and described, for obvious modifications will occur to a person skilled in the art.

Having described the invention, what is claimed is:

1. In a device for simultaneously rotating and axially displacing a clutch member, the combination of a motor, a rotatable driving shaft, said motor being in driving connection with said driving shaft, a driven shaft adapted to carry said clutch member and being rotatable and simultaneously shiftable in opposite directions along its axis of rotation, said driving shaft being in driving connection with said driven shaft for the rotation of the driven shaft, and shifting means engaging said driving and driven shafts and being operable for shifting said driven shaft axially in response to the rotation of said driving shaft, at least a portion of said shifting means being arranged axially oppositely of said motor as compared to the driven shaft, said shifting means including spring biased actuating means interposed between said driving and driven shafts, said driving shaft being hollow, said shifting means comprising a connecting rod extending axially through said hollow driving shaft and being rotatable and shiftable in axial directions and centrifugal actuating means connected to said driven shaft, said centrifugal actuating means comprising a housing mounted on the driving shaft and having radial bores, centrifugal weights movably disposed in said radial bores, said weights having each a thread, gears journalled on said driving shaft and each engaging one of said threads, a bushing movable axially relative to said driving shaft and being in driven connection with said gears whereby, upon rotation of said driving shaft, said weights will be moved radially outwardly and said bushing will be moved axially, said bushing being in driving connection with said driven shaft.

2. In a device, as claimed in claim 1, a step-down transmission engaging said driving and driven shafts and forming the driving connection therebetween.

References Cited by the Examiner

UNITED STATES PATENTS

| | | | |
|---|---|---|---|
| 417,086 | 12/1889 | Pratt | 192—105 |
| 2,207,652 | 7/1940 | Berges | 74—7 |
| 2,465,444 | 3/1949 | Gisonno | 192—105 |
| 2,578,094 | 12/1951 | Sears | 192—.02 |
| 2,720,955 | 10/1955 | Young | 192—105 |
| 2,733,796 | 2/1956 | McMillan et al. | 192—105 |
| 2,903,108 | 9/1959 | Ochtman | 192—18 |

FOREIGN PATENTS 61,230    8/1943    Denmark.

DON A. WAITE, *Primary Examiner.*

ANDREW R. JUHASZ, *Examiner.*

F. S. HUSAR, *Assistant Examiner.*